United States Patent Office 2,983,613
Patented May 9, 1961

2,983,613

ADDITION OF DEXTRAN TO BREAD DOUGHS

Raymond T. Bohn, Scarsdale, N.Y., assignor to R. K. Laros Company, Inc., Northampton County, Pa., a corporation of Pennsylvania No Drawing. Filed Sept. 12, 1958, Ser. No. 760,557

9 Claims. (Cl. 99—91)

This invention relates to improved bakery products and, more particularly, to such bakery products prepared from yeast-raised doughs. The invention is based upon the discovery that the incorporation of small quantities of dextran in bread doughs containing both yeast and gluten results in the production of breads which are softer, have a greater volume and longer shelf-life than ordinary breads made from doughs which do not contain dextran.

In the preparation of bakery products, it is desirable to include as much water as possible in the dough. A high percentage of water not only increases the yield of the product, but also increases the moisture content of the product. The product is therefore softer and its keeping quality improved. The amount of water which is absorbed in the dough is largely dependent upon the relative water absorption properties of the particular ingredients used to prepare the dough, most of the water being retained primarily by the farinaceous components of the dough. Although such components as defatted milk solids tend to increase total water absorption of the dough, several other components, such as sugar and fats, tend to decrease this water absorption. Sometimes certain chemicals such as calcium peroxide are added to doughs in small amounts so as to increase the amount of water absorbed by that dough.

In the preparation of bakery products which are prepared from doughs containing yeast and gluten, not only is it desirable to achieve a high moisture content in the dough, it is also desirable to effect a softening of the gluten content of that dough. The dough is then more extensible and the yeast action proceeds more effectively. The fermenation time is reduced and the rate of production of bakery products is increased.

I have found that by adding small quantities of dextran to doughs containing yeast and gluten, not only are the water absorption properties of said doughs greatly increased, but the gluten in the dough is softened. Moreover, I have found that vital gluten, which has been formed into a tough, elastic mass by mixing it with water, is softened by incorporating a small quantity of dextran in the mass. Because of the softening effect exerted by dextran upon the gluten, the handling properties of doughs containing both dextran and gluten are greatly improved, and the dough is rendered more extensible. Consequently, the dough is more readily formed into the desired shape for baking and the rate of production of baked products made from these doughs may be increased. Breads made from these doughs have been found to be softer, whiter, and more moist than ordinary doughs not containing the dextran. Moreover, the volume of bread baked from doughs which contain dextran is greater and the shelf-life is appreciably longer than that of bread baked from doughs which do not contain dextran.

Although the use of dextran in doughs in accordance with this invention is not limited to a dextran produced by any particular method, I prefer to use a dextran prepared via the fermentation of cane sugar. This preferred type of dextran is prepared by growing the microorganism *Leuconostoc mesenteroides* B512 on a suitable medium and in sufficient quantity until it has elicited the enzyme, dextransucrase, following which time a filtrate containing this enzyme is mixed with a 10% sugar solution which undergoes polymerization (under proper conditions) to dextran. The dextran is then precipitated with alcohol. After settling for a number of hours, the supernatant is removed and the precipitated dextran may be reprecipitated with alcohol to completely remove any extraneous materials. After the supernatant has been removed, the precipitated dextran is again dissolved, and the solution dehydrated, resulting in a dextran having a molecular weight of from about 20,000,000 to about 40,000,000.

The major ingredients used in the preparation of doughs are flour and water, the water content being about 60 to 65 percent based on the weight of the flour. Yeast, sugar, shortening, salt, non-fat milk solids, eggs, and baking powder and other ingredients may also be used in doughs. When a high-gluten baked product is desired, an additional quantity of vital gluten is added to the dough. When dextran is added to any of these doughs, the water absorption properties of the resultant dough is appreciably greater than that of doughs to which no dextran has been added. Moreover, doughs containing dextran have been found to be more extensible, probably as a result of the softening of the gluten content of the dough by the dextran.

Doughs are usually prepared by mixing flour, water and other ingredients together. The dextran may be added along with the other ingredients. However, in the preparation of bread, the sponge and dough method is very frequently used and involves two mixing operations. About 60 to 65% of the flour used in the dough, all of the yeast, and a sufficient amount of water are mixed together, this mixing step comprising the so-called sponge stage. The remaining flour and other ingredients are then added and mixed to produce a dough, this second step comprising the so-called dough stage. Although we prefer to add the dextran at the dough stage, it can also be added at the sponge stage or even at both stages. Alternatively, dextran may be incorporated into a mixture of gluten and water to soften the gluten content of the mixture and the resultant mixture added to any farinaceous dough or used in any product in which softened gluten is advantageous.

Although dextran may be used in doughs in amounts equal to from about 0.01 to about 10 percent (or even more) by weight, based on the weight of the flour content of the dough, there is no particular advantage to be gained by employing more than 5 percent by weight and in many instances substantially the full benefit of its presence may be achieved by using 1 percent by weight of dextran or even less, the percentage in each case being based on the weight of the flour content of the dough.

The following examples are illustrative of the use of dextran in farinaceous doughs in accordance with the invention:

*Example 1*

A dough was prepared by mixing 189 parts by weight of water with 300 parts by weight of a standard flour. The consistency of the dough was measured by a Brabender farinograph, an instrument used in the baking industry for measuring dough consistency. The consistency of this dough was 500 Brabender units (B.U.) on the farinograph chart, which records consistency from 0 to 1000 units. Nine parts by weight of dextran, (3 percent based on the weight of the flour), was then added and mixed into the dough. In order to maintain the consistency of the dough at 500 B.U., an additional 34 parts by weight of water was added to the dough. This additional water represented an increase of 11 percent of the water absorption of the dough, or an increase of 3.6 percent for each percent dextran incorporated in the dough.

*Example II*

A white pan bread was prepared by baking a dough containing 100 parts by weight of white flour, 60 parts by weight of water, 3 parts by weight of yeast, 5 parts by weight of sugar, and 1 part by weight of salt. A second white pan bread was then prepared in the same manner, except that in addition to the above ingredients, 3 parts by weight of dextran were added to the dough and an additional 12 parts by weight of water were added to the dough to bring the consistency of the dough back to what it was prior to the addition of the dextran. The addition of the 3 parts by weight of dextran increased the water absorption of the dough by a total of 12 percent, which represented a 4 percent by weight increase in the water absorption for each percent of dextran (based on the weight of flour) added to the dough.

Both of these doughs were baked under identical conditions. The bread which contained the dextran was about 20 percent greater in volume than the control, which did not contain dextran. Moreover, the bread which contained the dextran was more moist, had a whiter crumb color, and had a better shelf-life than the control.

The firmness of the bread crumb of both breads was measured by a Baker compressimeter, an instrument which is used in the cereal industry for determining the firmness of bread crumb on storage. Using this instrument, it was found that a total stress of 3 grams was required to compress a given thickness of the dextran-containing bread by 2.5 millimeters, while 7.2 grams of stress was required for a corresponding compression of the control, indicating that the bread crumb of the dextran-containing bread was appreciably softer than that of the control. After three days' storage, these stresses were found to be 5.2 grams for the bread containing dextran and 7.65 grams for the bread not containing dextran, indicating that the former had a longer shelf-life than the control.

The incorporation in bread doughs of quantities larger than 1 percent of dextran, based on the weight of the flour, does not appreciably further increase the volume of the resultant bread beyond 20 percent. Therefore, when breads were prepared by the sponge and dough method, using a typical white bread formula, and employing therein from about 1 percent to 3 percent dextran, based on the weight of the flour, these breads had approximately a 20 percent increase in volume over similar breads which contained no dextran.

*Example III*

Ten parts by weight of vital gluten were mixed with 30 parts by weight of water to form a tough elastic mass. When 1 part by weight of dextran was added to this gluten mixture, it became fluid and could be used to prepare high gluten bread doughs.

Although each of the above examples illustrates the use of dextran in doughs which are used in the manufacture of bread, similar results have been obtained when dextran is used in accordance with the method of the invention in various other farinaceous bakery products, such as rolls, buns, cakes and pastries.

I claim:

1. In the method of manufacturing bakery products from farinaceous doughs which contain both yeast and gluten, the improvement which comprises incorporating in the dough an amount of dextran sufficient to soften the gluten content of the dough and to increase the specific volume of the resultant bakery product.

2. In the method of manufacturing bakery products from farinaceous doughs which contain yeast and gluten, the improvement which comprises incorporating in the dough an amount of dextran equal to from about 0.01 to about 10 percent by weight of the flour contained in the dough, thereby softening the gluten content of the dough and increasing the specific volume of the resultant bakery product.

3. The method of claim 2, wherein dextran is incorporated in the dough in an amount equal to from about 0.5 to about 5.0 percent by weight of the flour contained in the dough.

4. The method of claim 2, wherein the molecular weight of the dextran is from about 20,000,000 to about 40,000,000.

5. A bakery product prepared from a farinaceous yeast-raised dough which contains both gluten and an amount of dextran equal to from about 0.01 to about 10 percent by weight of the flour content of said dough.

6. The bakery product of claim 5, wherein the dough used to prepare the bakery product contains an amount of dextran equal to from about 0.5 to about 5 percent by weight of the flour content of said dough.

7. The bakery product of claim 5, wherein the dough used to prepare the bakery product contains dextran having a molecular weight of from about 20,000,000 to about 40,000,000.

8. The method of softening gluten which comprises incorporating dextran in a mixture comprising gluten and water, said dextran being added in an amount sufficient to soften the gluten.

9. The method of claim 8, wherein the molecular weight of the dextran is from about 20,000,000 to about 40,000,000.

References Cited in the file of this patent

UNITED STATES PATENTS

| 1,524,783 | Curtner | Feb. 3, 1925 |
| 1,795,980 | Wahl | Mar. 10, 1931 |
| 2,089,217 | Mahoney | Aug. 10, 1937 |
| 2,158,392 | Ament | May 16, 1939 |
| 2,731,349 | Toulmin | Jan. 17, 1956 |

FOREIGN PATENTS

| 347,512 | Great Britain | Apr. 30, 1931 |

OTHER REFERENCES

"The Staling and Keeping Quality of Bread," Special Report No. 15, issued November 1936, The Research Association of British Flour Millers (London), pp. 15, 25 and 26.

The Bakers Digest, June 1958, pp. 42 to 45 and 73.